Aug. 8, 1950
J. H. ANDERSON
2,517,822
INTERMITTENT EXPLOSION GAS TURBINE
PLANT WITH DILUTION AIR
Filed Oct. 23, 1947
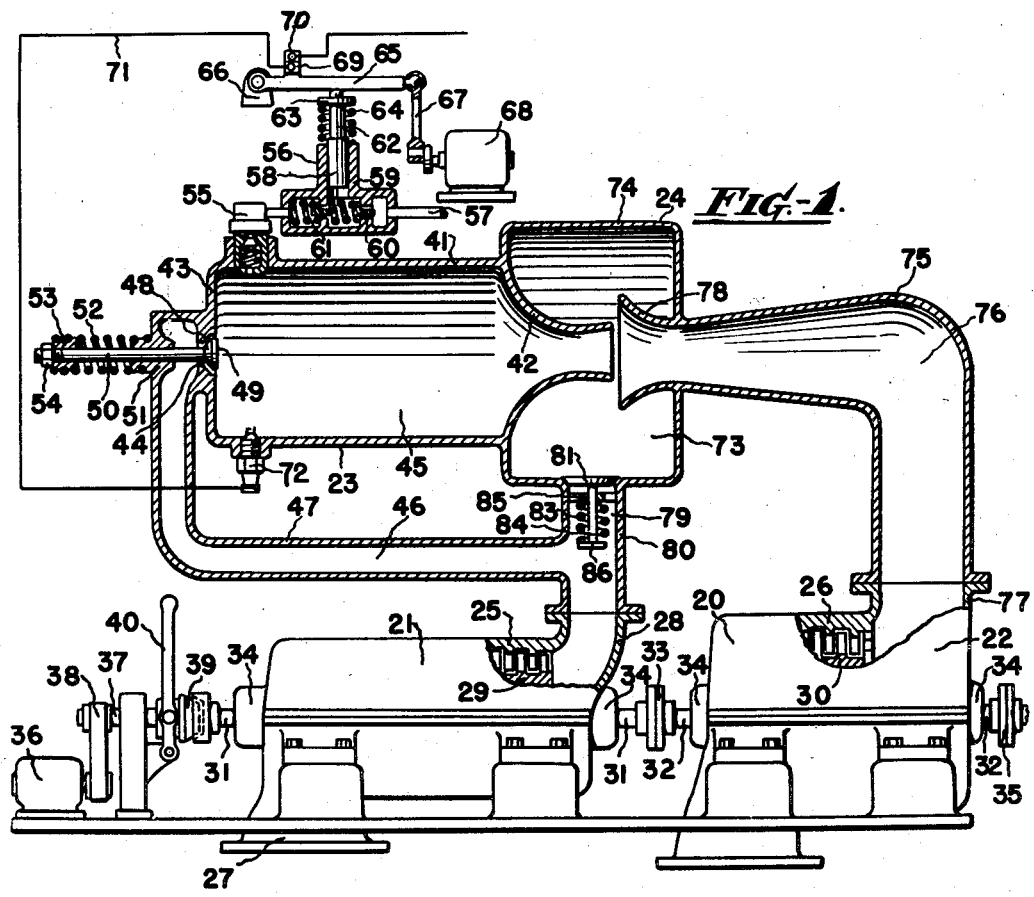
INVENTOR
James H. Anderson
BY
HIS ATTORNEY.

Patented Aug. 8, 1950

2,517,822

UNITED STATES PATENT OFFICE 2,517,822

INTERMITTENT EXPLOSION GAS TURBINE PLANT WITH DILUTION AIR

James H. Anderson, Easton, Pa., assignor to Ingersoll-Rand Company, New York, N. Y., a corporation of New Jersey Application October 23, 1947, Serial No. 781,652

3 Claims. (Cl. 60—41)

This invention relates to turbines, and more particularly to an explosion gas turbine plant utilizing high temperatures of combustion without subjecting the turbine to this high temperature, and thus raising tremendously the overall thermal efficiency of the gas turbine plant.

One object is to utilize the high temperature combustion process in such a way as to introduce the resulting gas into the turbine at a given inlet temperature and at a lower entropy than has heretofore been possible.

Another object is to construct an explosion gas turbine plant wherein the ideal fuel-air mixture may be utilized in an explosion chamber.

A further object is to utilize a portion of the air discharged by a fluid compressor driven by the turbine for cooling the explosion gas before it enters the turbine.

Another object is to introduce an explosion gas mixture into a turbine at a different temperature and pressure than the explosion gas has on leaving the explosion chamber.

Further objects will be in part obvious and in part pointed out hereinafter.

In the accompanying drawing in which similar reference numerals refer to similar parts:

Figure 1 is a longitudinal elevation, partly broken away, of an explosion gas turbine plant constructed in accordance with the practice of the invention and showing the position of the controlling devices when at rest, and Figure 2 is a view similar to a portion of Figure 1 showing the controlling devices in the positions they will occupy at the instant of ignition of a fuel charge.

Referring more particularly to the drawing and at first to Figure 1, an explosion gas turbine plant, designated in general by 20, includes a compressor 21 driven by a turbine 22 and used to provide compressed air to an explosion power-generating unit 23 and a thermal compressor 24. The explosion power unit 23 supplies the explosion gas serving to drive the turbine 22.

The compressor and the turbine, as shown, are of the axial-flow type and having casings 25 and 26, respectively. The compressor casing 25 has the usual inlet portion 27 at one end for admission of air thereinto, and at the opposite end an outlet portion 28 forming a passage through which the compressed air is discharged.

Within the casings 25 and 26 are, respectively, rotors 29 and 30 which are coaxially arranged with each other and have the opposed ends of their shafts 31 and 32 connected together by a coupling 33. The casings are provided with outboard bearings 34 for the shafts 31 and 32 and a coupling 35 is attached to the free end of the shaft 32 to serve as a power take-off.

For starting purposes, in this instance, a motor 36 is adapted to impart rotary movement to the shaft 37 through a belt drive 38 causing the initial rotation of the rotors 29 and 30. After the plant has started, a clutch mechanism 39 attached to the opposed ends of the shafts 31 and 37 can be disengaged by operating a lever 40, thereby making the compressor 21 entirely dependent on the turbine 22 for its operating power.

The explosion power unit 23 may be of any conventional type but is preferably of the intermittent explosion type and consists of a cylinder 41 which has a nozzle 42 at one end through which the explosion gas is discharged and, at the opposite end, a head 43 having an inlet port 44 therein. It also includes a means for injecting fuel into an explosion chamber 45 and for igniting the fuel-air mixture therein.

The air discharged from the compressor 21 is conveyed to the port 44 through a passage 46 in a discharge-pipe 47. The flow of the air through the port 44 is controlled by a reciprocatory valve 48, one end of which constitutes a pressure surface 49 that is constantly subjected to the pressure in the chamber 45. On the valve is a stem 50 that extends through the port 44 and slidably through the wall 51 of the pipe 47 overlying the head 43.

The valve 48 when at rest is held in an unseated position in the port 44, but requires only a slight degree of movement to close the port. It is held thus by a spring 52 acting between the wall portion 51 and a collar member 53 which is held on one end of the stem 50 by a nut 54 theadedly connected thereto. The mass of the valve and the scale of the springs are so selected as to allow the valve, due to pressure differential existing on the sides thereof, to admit only enough combustion supporting air into the explosion chamber 45 for permitting a good fuel-air mixture therein. By using a good fuel-air mixture, combustion will cause the temperature of the explosion gas to be so high that direct use in the turbine 22 would be prohibitive.

The explosion chamber 45 is provided with a fuel spray nozzle 55 arranged in the cylinder 41 preferably at a point near the head 43 and positioned to direct a spray of fuel into the chamber 45. Fuel is supplied to the spray nozzle 55 by a fuel pump 56 which itself may receive fuel under pressure from an outside source (not shown) through the fuel pipe 57. As a result of the reciprocating movement of the plunger 58 within the pump casing 59, fuel is moved through the spring-pressed check valves 60 and 61 to the spray nozzle 55.

On the plunger 58 is a stem 62 having a collar 63 to receive one end of a spring 64 which acts between the collar and the pump casing 59 to retract the plunger on its suction stroke. The movement for the pumping stroke is applied to the stem 62 by a rocker arm 65 which has one of its ends pivotally connected to a body 66. The rocker motion is imparted to the rocker arm 65 by a crank arm 67 pivotally connected thereto, and adapted to be operated by a motor 68 whose speed corresponds to the frequency of the pressure waves in the explosion chamber 45.

Situated on the rocker arm 65, and close to the stationary pivot end thereof, is a movable contact 69 of an interruptor 70 arranged in an electrical circuit 71 which is connected to a spark plug 72. The contact 69 is positioned on the rocker arm 65 so that it will engage with the stationary contact of the interruptor 70 only at the end of the suction stroke of the plunger 58. The spark plug 72 projects through an aperture in the cylinder 41 and, when the interruptor 70 is closed, provides a spark for igniting the fuel-air mixture in the exlosion chamber.

The nozzle 42 has a flow area such as to assure a high velocity of the explosion gas passing therethrough, and the inner surfaces serve to partially reflect the pressure waves of the explosions which occur in the chanmber 45. The gas passes from the nozzle through a low pressure chamber 73 defined by a housing 74 of the thermal compressor 24. The housing 74 surrounds the nozzle 42 and is connected to a conduit 75 which forms a diffuser chamber 76 and has one of its ends connected to an inlet portion 77 of the turbine casing 26. A flared portion 78 of the conduit 75 extends into the housing 74 and is in coaxial relation with the nozzle 42.

Compressed air is conveyed from the compressor 21 to the chamber 73 through a passage 79 formed in a casing 80. A check valve 81, which is responsive to the pressures existing in the passage 79 and the chamber 73, is normally held in seated position in a housing port 82 by a spring 83 and has a valve stem 84 connected to one end thereof. The spring 83 acts between a perforated plate 85 attached to the casing 80 and a boss 86 on one end of the valve stem 84.

At the beginning of an operating period of the plant, the motor 36 is started and, with the clutch 39 engaged, the rotors 29 and 30 are put into operation. This supplies some compressed air to the explosion chamber 45. Simultaneously the timing motor 68 is put into operation causing fuel to be pumped into the explosion chamber and a spark to occur in the spark plug 72. On ignition of the fuel-air mixture a pressure wave is set up initially causing the valve 48 to seat in the port 44, thus stopping the flow of compressed air through the port 44 into the explosion chamber 45. The pressure wave moves toward the opposite end of the explosion chamber along with the explosion gas, and at this point, the explosion gas is exhausted at a high velocity through the nozzle 42. With movement of the pressure wave toward the nozzle 42 a low pressure area develops in the explosion end of the chamber 45 allowing the check valve 48 to open and a charge of compressed air to be admitted into the explosion chamber. The charge of air admitted is of such size as to assure fuel-air mixture capable of producing a good, high temperature explosion. A part of the pressure wave is reflected from the nozzle 42 back toward the explosion end of the chamber 45 further compressing the new charge of air and simultaneously closing the valve 48. Fuel is again injected by the pump 56 and the resulting fuel-air mixture exploded by the spark plug 72, thereafter a repetition of the described cycle occurs.

As the explosion gas passes out of the nozzle 42, at a high velocity and a presssure lower than the pressure of the air discharged by the compressor, a low pressure is created in the chamber 73 which causes the valve 81 to open and admit compressed air thereinto. This air is sucked into the explosion gas stream thereby cooling it to a temperature suitable for use in the turbine 22. Before entry into the turbine, however, the velocity of this mixture of explosion gas and compressed air is reduced and the pressure allowed to build up, in the diffuser chamber 76.

It will be readily understood that a fuel-air mixture permitting high temperature combustion in the explosion chamber 45 can be utilized in this explosion gas turbine plant. After the mixture has burned at a temperature considerably higher than could be used in the turbine 22, it is cooled by the introduction of compressed air into the explosion gas stream while passing through the low pressure chamber 73.

By using a good fuel-air mixture permitting high temperature combustion rather than adding the cooling air directly into the explosion chamber 45, the combustion occurs with a much lower entropy value. The explosion unit 23 is structed to withstand the effects of the high temperature, but cooling air must be added in the thermal compressor 24 before the explosion gas can be used in the turbine 22. This method of utilizing an explosion process with a low entropy value produces a marked increase in the overall efficiency of the explosion gas turbine plant.

From the foregoing description it will be apparent to those skilled in the art that further modifications may be made without departing from the spirit of the invention, and it is to be understood that the invention includes all such modifications as may fall within the scope of the appended claims.

I claim:

1. In an explosion gas turbine plant, the combination with a turbine, a compressor driven by the turbine, an explosion power-generating unit having an explosion chamber, means for delivering compressed air from the compressor to the explosion chamber, of means for causing intermittent explosions in said chamber, a valve responsive to changes in pressure within said chamber for controlling the flow of compressed air through the first said means, a nozzle attached to the said unit for conveying the explosion gas at low pressure from the explosion chamber, a housing surrounding the nozzle and defining a low pressure chamber for enabling the introduction of compressed air into the explosion gas, a conduit forming a diffuser chamber for delivering the explosion gas mixture to the turbine, and a means for conveying compressed air from the compressor to the low pressure chamber, and a valve acting responsively to changes in pressure within the low pressure chamber for controlling the flow of air thereinto.

2. In an explosion gas turbine plant, the combination with a turbine, a compressor driven by the turbine, an explosion power-generating unit having an explosion chamber, means for delivering compressed air from the compressor to the explosion chamber, of means for causing intermittent explosions in said chamber, a nozzle attached to the said unit for conveying the explosion gas at low pressure from the explosion chamber, a housing surrounding the nozzle, a low pressure chamber defined by the housing for enabling the introduction of compressed air into the explosion gas, a casing having a passage for conveying compressed air from the compressor to the low pressure chamber, a pressure responsive check valve in the passage for intermittently allowing compressed air to pass into the low pressure chamber, and a conduit connected into said housing and forming a diffuser chamber for delivering the explosion gas mixture to the turbine.

3. In an explosion gas turbine plant, the combination with a turbine, a compressor driven by the turbine, a power-generating unit having an explosion chamber for providing intermittent high-temperature explosions of a combustible mixture therein, means for delivering a part of the compressed air from the compressor to the explosion chamber, of a nozzle attached to the said unit for conveying the explosion gas at low pressure from the explosion chamber, a housing surrounding the nozzle, a low pressure chamber defined by the housing for enabling the introduction of compressed air into the explosion gas, an inlet port in the housing, a casing having a passage for conveying a part of the compressed air from the compressor to the inlet port, a check valve to seat in the inlet port and acting responsively to pressures in the low pressure chamber and the passage for permitting intermittent flow of compressed air through the inlet port, and a conduit connected into said housing and forming a diffuser chamber for delivering the explosion gas mixture at a reduced temperature to the turbine.

JAMES H. ANDERSON.

REFERENCES CITED

The following references are of record in the file of this patent:

UNITED STATES PATENTS

| Number | Name | Date |
|---|---|---|
| 2,280,765 | Anxionnaz | Apr. 21, 1942 |
| 2,332,866 | Müller | Oct. 26, 1943 |
| 2,396,068 | Youngash | Mar. 5, 1946 |
| 2,404,335 | Whittle | July 16, 1946 |
| 2,446,059 | Peterson | July 27, 1948 |